United States Patent [19]

Broadhead et al.

[11] Patent Number: 5,222,567
[45] Date of Patent: Jun. 29, 1993

[54] POWER ASSIST DEVICE FOR A WHEELCHAIR

[75] Inventors: Douglas G. Broadhead, Scarborough; Blaine M. Hobson, King City, both of Canada

[73] Assignee: Genus Inc., Ontario, Canada

[21] Appl. No.: 691,909

[22] Filed: Apr. 26, 1991

[51] Int. Cl.⁵ .............................................. B60K 1/00
[52] U.S. Cl. .................................. 180/15; 180/65.1; 180/907
[58] Field of Search .................. 180/15, 22, 65.1–65.7, 180/907

[56] References Cited

U.S. PATENT DOCUMENTS

| | | |
|---|---|---|
| 2,495,573 | 1/1950 | Duke . |
| 2,635,703 | 4/1953 | Goeller . |
| 2,751,027 | 6/1956 | McLaughlin . |
| 2,798,565 | 7/1957 | Rosenthal . |
| 2,931,449 | 4/1960 | King . |
| 2,978,053 | 4/1961 | Schmidt . |
| 3,023,825 | 3/1962 | Rabjohn . |
| 3,387,681 | 6/1968 | Rabjohn . |
| 3,573,877 | 4/1971 | Locke . |
| 3,770,070 | 11/1973 | Smith . |
| 3,794,132 | 2/1974 | Moon . |
| 3,848,883 | 11/1974 | Breacain . |
| 3,905,437 | 9/1975 | Kaiho et al. .......................... 180/15 |
| 4,323,133 | 4/1982 | Williams . |
| 4,386,672 | 6/1983 | Coker . |
| 4,503,925 | 3/1985 | Palmer . |
| 4,759,418 | 7/1988 | Goldenfeld et al. ............... 180/65.1 |
| 4,944,359 | 7/1990 | Doman et al. . |

FOREIGN PATENT DOCUMENTS 0317841 12/1989 Japan ................................. 180/907

Primary Examiner—H. Grant Skaggs
Attorney, Agent, or Firm—Bereskin & Parr

[57] ABSTRACT

A power assist device for a wheelchair comprising a body, a drive wheel connected to the body and being movable between a raised position and a lowered surface engaging position, attachments for securing the body to the frame, a first motor for driving said drive wheel at least when the drive wheel is in the lowered surface engaging position, a second motor connected to the drive wheel for raising and lowering said drive wheel, a biaser, for biasing the drive wheel into surface engaging driving contact, a manually initiated electronic controller for controlling the power assist device, and a source of electrical power.

24 Claims, 5 Drawing Sheets

POWER ASSIST DEVICE FOR A WHEELCHAIR

FIELD OF THE INVENTION

The present invention relates to a power assist device for a wheelchair having a frame. In particular, the present invention relates to a device run by electric motors which adds drive to an otherwise manually powered wheelchair.

BACKGROUND OF THE INVENTION

Wheelchairs are presently used by people who have temporarily or permanently lost the ability to walk. In general, there are two types of wheelchairs, namely, those which are manually powered and those which have some form of power assist drive.

With respect to the manually driven wheelchairs, such wheelchairs typically have relatively small swivelling front wheels and large rubber rimmed rear wheels. Gripping rails may be provided on the rear wheels so that persons may propel themselves along by pulling down on the wheels or the gripping rims. A problem arises however in respect of low arm-strength wheelchair riders. In some cases the persons needing wheelchairs will not have sufficient arm strength to propel the wheelchairs along manually. This is especially true in respect of upramps, downramps and curbs which all require additional arm strength to be negotiated.

One solution is to provide motorized wheelchairs which need only be steered. However, the cost of fully motorizing a wheelchair is prohibitive and thus a fully motorized wheelchair is an appropriate solution in only a small number of cases. What is preferred in most cases is some other lower cost solution. Examples of such low cost solutions exist, and include portable units which may be attached to the frame of manual wheelchairs to provide drive to the wheelchairs when needed, but when not needed can be raised out of the way.

One example of such a device is contained in U.S. Pat. No. 4,759,418 entitled WHEELCHAIR DRIVE to Goldenfeld et al. This patent discloses an electric motor attached to a drive wheel and mounted on a carrier. The device may be pivoted about an attachment to the frame between a raised and lowered position. The pivoting is accomplished by means of a cable, an end of which is conveniently placed within reach of the wheelchair passenger. When the cable tension is released, the drive wheel and motor pivot down under their own weight to a ground engaging position. When the drive wheel is pushing against resistance, a force component keeps the drive wheel engaged with the ground to propel the wheelchair. In the absence of such resistance, there is nothing keeping ground engaging contact.

This device may not be used for braking when going down a downramp. This is unsatisfactory and unsafe.

Another solution is proposed in U.S. Pat. No. 3,905,437 to Kaiho et al. entitled ELECTRICALLY DRIVEABLE WHEELCHAIR. Kaiho discloses a drive wheel attached to a motor housing which is moved between a raised and lowered position by a jack. A single motor is used, and upon being energized, both the drive wheel and the jack begin turning. The jack lowers the spinning drive wheel into contact with the ground. Thus, when the motor is running, the jack and the drive wheel are turning. This results in a very dangerous situation since the motor must be reversed to raise the device, hence the drive wheels will rotate backwardly causing the wheelchair to briefly back up. This is dangerous since if the device was used to reach the top of a ramp it potentially could pull the wheelchair occupant back down the ramp while it is being retracted.

Kaiho recognizes the problem by providing a free wheel between the electric motor and the drive wheel so that the motor only communicates forward drive to the drive wheel. However, this means that the device cannot be reversed to back up the wheelchair. Also, Kaiho's device cannot be used for downramps since the wheel is free to pivot rearwardly.

What is desired therefore is a power assist device to overcome the problems of these other devices. Preferably it should be mounted to the frame of an ordinary manual wheelchair and should be relatively inexpensive. Further, it should be movable from a raised position to a lowered position and in the lowered position should be operable on up and down ramps. It should be capable of working forwardly and may be adapted to work in reverse.

BRIEF SUMMARY OF THE INVENTION

According to the present invention there is provided a power assist device for a wheelchair which is wheeled along a surface and has a frame, said power assist device comprising:

a body, a drive wheel connected to said body and being movable between a raised position and a lowered surface engaging position, attachments for securing said body to said frame, a first motor for driving said drive wheel at least when said drive wheel is in the lowered surface engaging position, a second motor connected to the drive wheel for raising and lowering said drive wheel independently of whether said drive wheel is being driven by said first motor, a biaser, for urging said drive wheel into surface engaging driving contact, a manually initiated electronic controller for controlling said power assist device, and a source of electrical power.

BRIEF DESCRIPTION OF THE DRAWING FIGURES

Embodiments of the invention will now be described, by way of example only, with reference to the accompanying drawings, wherein.

DESCRIPTION OF PREFERRED EMBODIMENT

Figure 1:
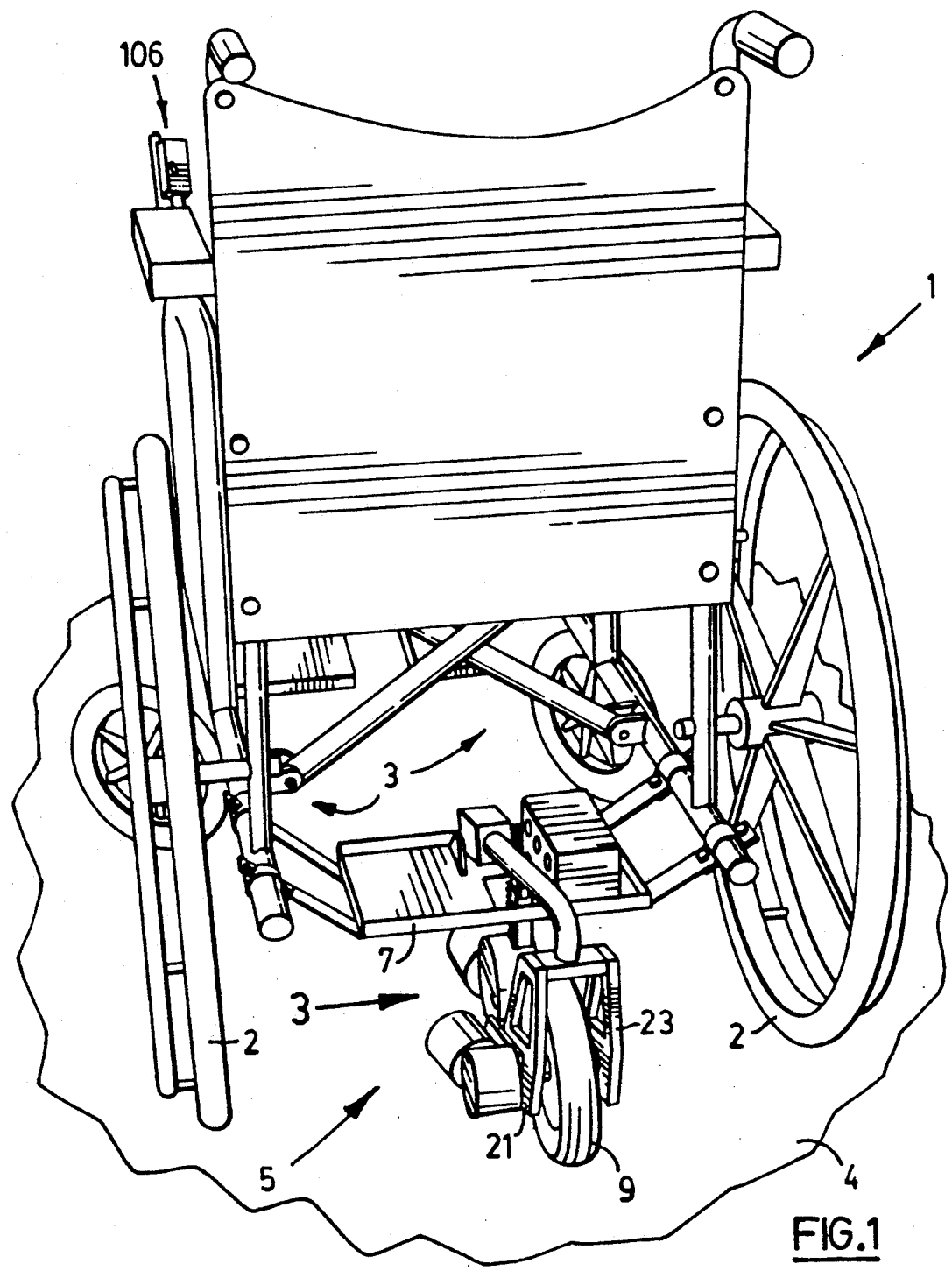
FIG. 1 is a perspective view from the rear of a power assist device for a wheelchair showing one embodiment of the present invention.

FIG. 1 shows a wheelchair 1 which is on a surface 4 and has rear wheels 2 and a frame 3. A power assist device 5 is also shown and comprises a body 7 and a drive wheel 9 connected to the body 7. The drive wheel 9 is movable between a raised position as shown in FIG. 2 and a lowered position engaging the surface 4 as shown in FIG. 3.

Figure 2:
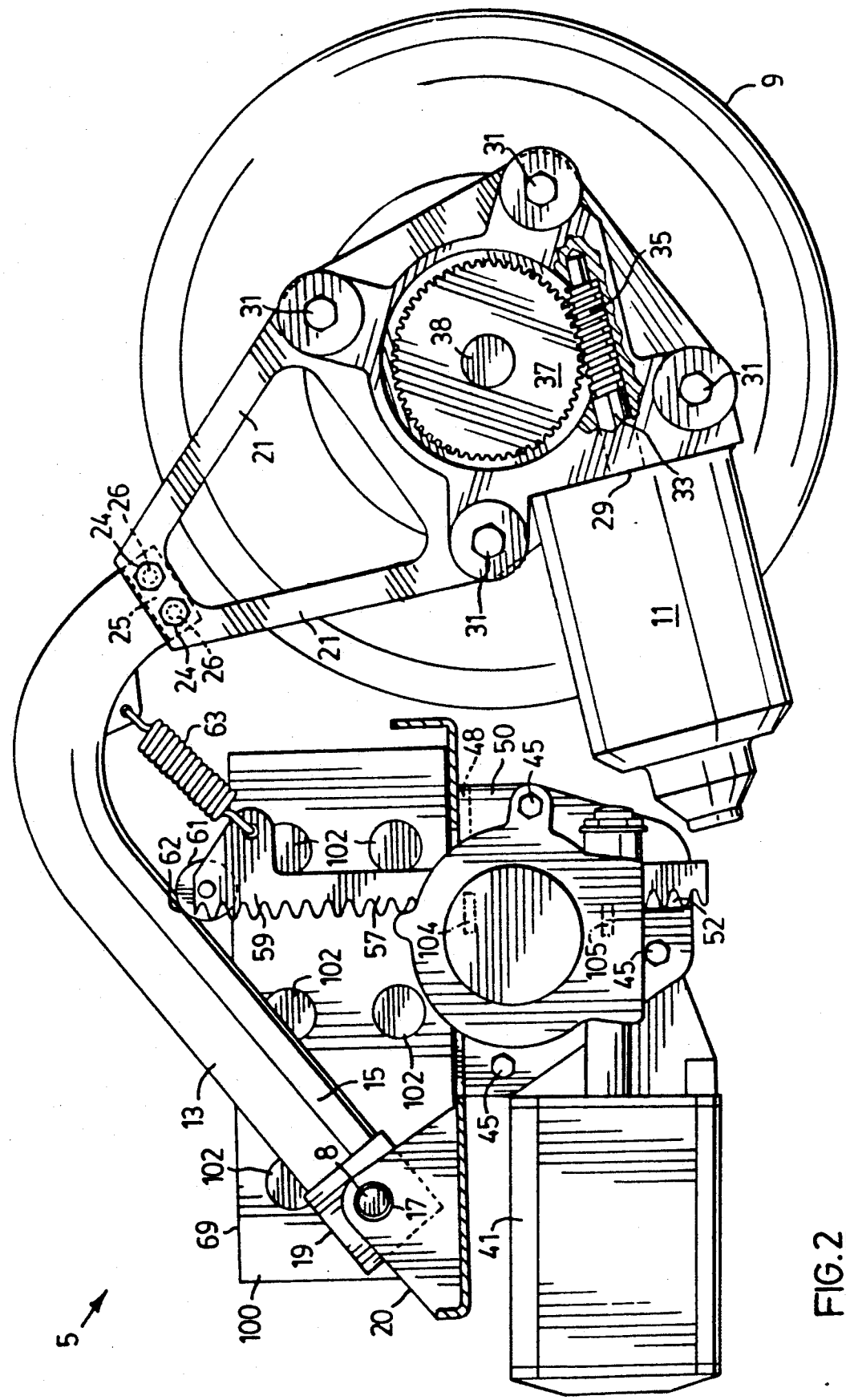
FIG. 2 is a side view partially in section of the embodiment shown in FIG. 1 with the device in an elevated position.
Figure 3:
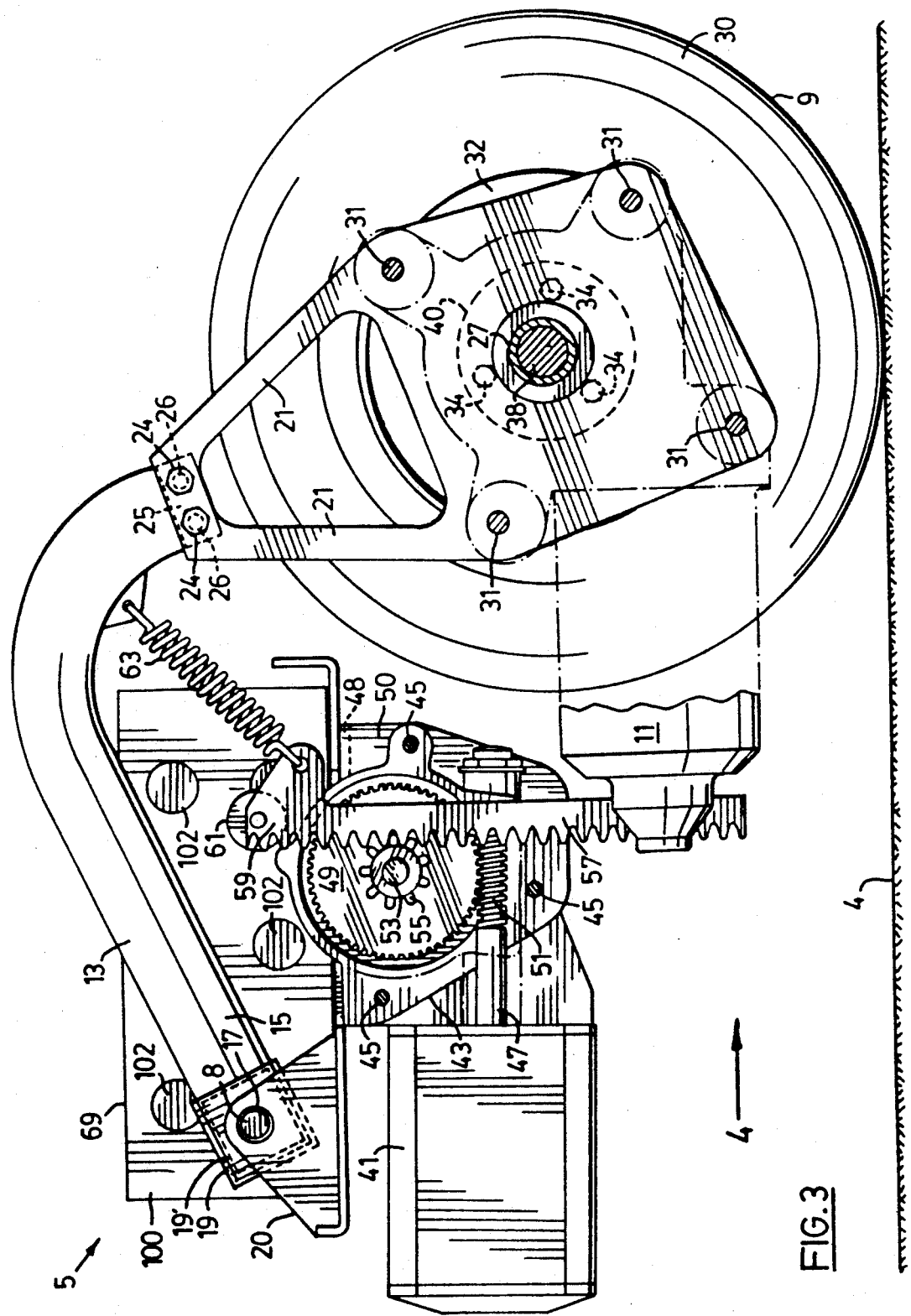
FIG. 3 is a side view partially in section of the embodiment shown in FIG. 1 with the device in a lowered surface engaging contact.

As shown in a side view of the device in FIG. 2, the drive wheel 9 and a first motor 11 are carried on a pivoting arm 13. A first end 15 of the pivoting arm 13 is pivotally attached to the body 7 at a pivot point 8. More particularly, a swing arm block 19 which caps the first end 15 is pivotally attached to at least one bracket 20 by a thrust bearing assembly indicated generally by the numeral 17. It will be appreciated by those skilled in the art that the bracket 20 and thrust bearing assembly 17 may be substituted with a hinge-type assembly or the like.

Opposite the first end 15 of the pivoting arm 13 are two generally opposed support plates 21, 23 (plate 23 is not shown in FIG. 2, but is shown in an end view in FIG. 4) connected to said arm 13. Support plates 21, 23 may be connected to said pivoting arm 13 by bolts 24 and arm plate 25, said arm plate 25 being preferably integral with the arm 13. The bolts 24 are inserted through apertures 26 in the support plates and screwed into holes in said arm plate 25 aligned with said apertures 26. It will be appreciated that the bolts 24 and arm plate 25 may be omitted if the support plates 21, 23 are made integral with said pivoting arm 13.

The drive wheel 9 is located between the support plates 21, 23 and rotates about the longitudinal axis of a drive wheel axle 27 located between said support plates. The longitudinal axis is preferably parallel to the axis of rotation of the main wheels 2 of the wheelchair. A hub 28 of the drive wheel 9 is adapted to rotate about said axis of the drive wheel axle 27. A hub plate 32 is connected to each outer face of hub 28 by hub bolts 34, and is preferably adapted to carry a tire element 30 which comes into surface engaging driving contact with the surface 4. The tire element 30 may be made of rubber or other suitable material selected to minimize slippage between the drive wheel 9 and the surface 4 when the power assist device 5 is driving said wheelchair 1. It will also be appreciated that the intermediate portion of the hub, between an inner segment closest to the drive wheel axle 7 and said outer periphery, may be comprised of a solid piece of material or a plurality of individual spokes connecting said inner segment and said outer periphery, or of spoke-like elements integral with said inner segment and said outer periphery.

The first motor 11 is pivotally attached to the body 7. It is connected to one of the support plates 21, 3, and drives the drive wheel 9 when said drive wheel 9 is in the lowered surface engaging position. In this embodiment the first motor 11 is connected to support plate 23 by a first motor plate bracket 29 and bolts 31. Good results have been achieved by using four bolts 31 for mounting the first motor 11 onto the bracket 29. A first drive shaft 33 extends between the first motor 11 and the drive wheel 9 and has a first drive take off 35 for imparting rotation to the drive wheel 9. The first drive take off 35 comprises a worm gear which engages a first gear 37. The first gear 37 is connected to an output shaft 38 (see FIG. 4), said shaft 38 rotating with said gear 37. Drive wheel axle 27 is mounted onto output shaft 38 to rotate therewith. The outer surface of the output shaft 38 and the corresponding inner surface of the axle 27 have mating threads for mounting said shaft 38 and said axle 27 together as shown at 44. The outer surface of the axle 27 has an outwardly protruding key 36 which mates with a drive key groove (not shown) on the inner surface of the hub 28 to rotate said hub 28 with the drive wheel axle 27. Stationary bridge members 39 are located between the support plates 21, 23 and the hub 28 to hold said drive wheel 9 between said support plates 21, 23. Although said bridge members 39 are integral with said support plates 21, 23, it will be appreciated that in an alternate embodiment they may be distinct elements connected to said support plates by a binding agent or other appropriate means.

Satisfactory results have been achieved with needle bearings shown at 46 between said stationary bridge members 39 and said drive axle 27 to facilitate rotation of said axle 27 relative to said bridge members 39. There are also thrust bearings and washers 40 between the bridge members 39 and the hub 28 to facilitate rotation of said hub 28 relative to said bridge members 39. A nut and thrust bearing assembly (not shown, but location is indicated by the numeral 42 in FIG. 4) is mounted onto the threaded end of drive axle 27 to clamp the drive wheel 9 between the support plates 21, 23. It will be appreciated by those skilled in the art that alternate known configurations may be used both to impart rotation from the drive motor 11 to the drive wheel 9 and to allow the drive wheel 9 to rotate.

In FIGS. 2 and 3, a second motor 41 for raising and lowering the drive wheel 9 is connected to the body 7 by a second motor plate bracket 43 which is preferably L-shaped in cross-section having a horizontal leg 48 and a vertical leg 50. Bolts 45 connect the second motor 41 to the bracket 43. A second drive shaft 47 extends between the second motor 41 and a second gear 49. The second drive shaft 47 has a second drive take off 51, comprising a worm gear, which engages a second gear 49 that rotates about second axle 53. A third gear 55 that rotates about the second axle 53 and is connected to the second gear 49 engages a translator 57 for raising and lowering the drive wheel 9. A recess 52 in plate bracket 43 acts as a guide for the translator 57 as it is raised or lowered.

An upper portion 59 of the translator 57 supports the pivoting arm 13 in a raised position (FIG. 2). Said upper portion 59 may include a roller 61 attached to the translator 57. The roller 61 comes into rolling contact with the pivoting arm 13 at point 62. Said translator 57 is raised or lowered by the second motor 41. In a lowered position (as in FIG. 3) the drive wheel 9 is in a surface engaging position. At this point the upper portion 59 of the translator 57 has been lowered out of contact with the pivoting arm 13.

In said lowered position, the translator 57 displaces a biaser 63 which in turn tends to urge the drive wheel 9 into said surface engaging contact. In particular, the biaser 63 is adapted to bias said drive wheel 9 into surface engaging driving contact with sufficient frictional engagement between said drive wheel 9 and said surface 4 for said power assist device 5 to drive said wheelchair 1. The biaser 63 at the present embodiment comprises a spring, one end of which is attached to the upper portion 59 of the translator 57 and the other end of which is attached to the pivoting arm 13. It will be appreciated by those skilled in the art that other configurations may also be used. For example, by replacing the spring with a torque bar at the first end 15 of the pivoting arm 13 the drive wheel 9 can also be urged into contact with the surface. A torque bar as illustrated in dotted outline at 19' in FIG. 3.

Figure 4:
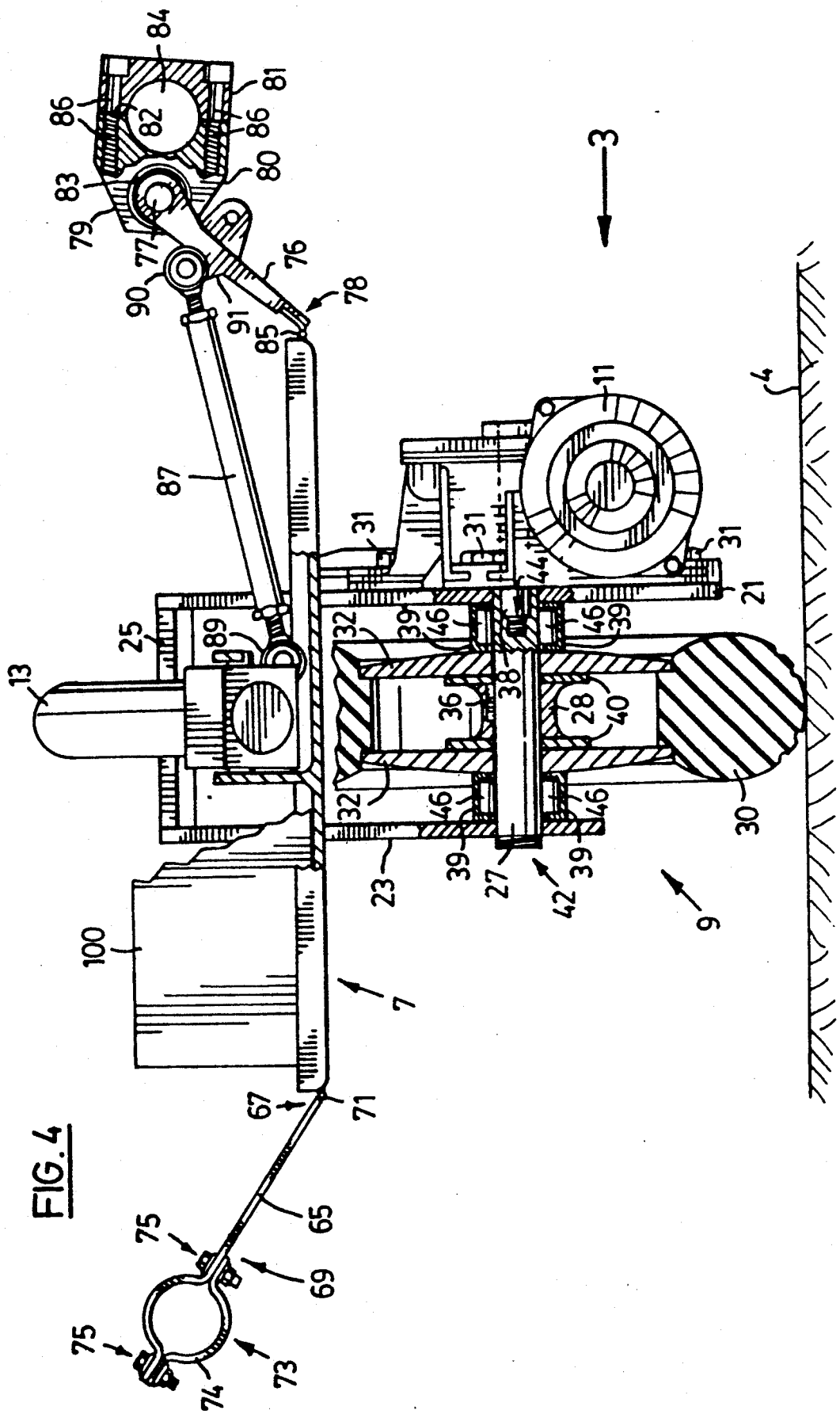
FIG. 4 is an end view partially in section of the embodiment shown in FIG. 1.

As shown in FIG. 4, the power assist device 5 has attachments for securing the body 7 to the frame 3 of the wheelchair 1. The attachments include a plate 65 having generally parallel first and second edges 67, 69 respectively. The first edge 67 is pivotally connected to the body 7 by a first hinge assembly 71. This allows the device 5 to be mounted on chair frames of varying widths. It will be appreciated that the first hinge assembly 71 may be omitted if the first edge 67 is made integral with the body 7. The plate 65 may have holes punched therein (not shown) to reduce the overall weight of the device 5, but without unduly compromising the structural integrity of said plate 65.

The second edge 69 has a securing means 73 for securing the plate 65 to the frame 3. The preferred embodiment of the securing means 73 comprises a clamp 74 adapted to be secured to the frame 3 by nuts and bolts 75, although any comparable arrangement may be substituted therefor. It will be further appreciated that the clamp and locking bolt assembly may be omitted if the second edge 69 is made integral with the frame 3.

An alternative embodiment of the attachments is also shown in FIG. 4. This alternative is designed for quickly releasing the body 7 from the frame 3. In this case the attachments include at least one mounting clamp 79, comprised of a clamp body made of separable segments 80, 81 split along the line 82. The clamp defines two holes 83, 84. The first hole 83 is adapted to receive a support pin 77 connected to the supporting member 76, said support pin 77 being pivotally connected to said mounting clamp 79. The second hole 84 is adapted to receive a segment of the frame 3. The mounting clamp 79 may therefore be secured to said segment of the frame 3 by inserting bolts into holes 86 within the clamp segments 80, 81 and securing said segments together so as to frictionally engage the clamp with said portion of the frame 3. The end of the supporting member 76 opposite from the support pin 77 is pivotally connected to the body 7 by a second hinge assembly 85 which is to accommodate varying widths of wheelchair frames. Said second hinge assembly 85 is attached to the body 7 and is secured to the member 76 by at least one mechanical fastener at attaching point 78. This alternative embodiment further includes a rod 87 having spherical rod ends 89, 90 said rod 87 connected at the rod end 89 to the body 7 and at the rod end 90 to mounting bracket 91 on the supporting member 76. Said rod ends 89, 90 are threaded into the body of rod 87 thereby allowing the length of the rod 87 to be adjusted to accommodate varying widths of wheelchair frames. Rod 87 provides stability to the power assist device 5 when it is in operation. It also keeps the attachments in a fixed orientation when the device 5 is removed from the frame 3 for convenient subsequent reinsertion of said device 5 into said frame 3. It will be appreciated that the second hinge assembly 85 may be omitted if the supporting arm 76 is made integral with the body 7, and likewise the support pin 77 and mounting clamp 79 may be omitted if the supporting member 76 is made integral with the frame 3.

Figure 5:
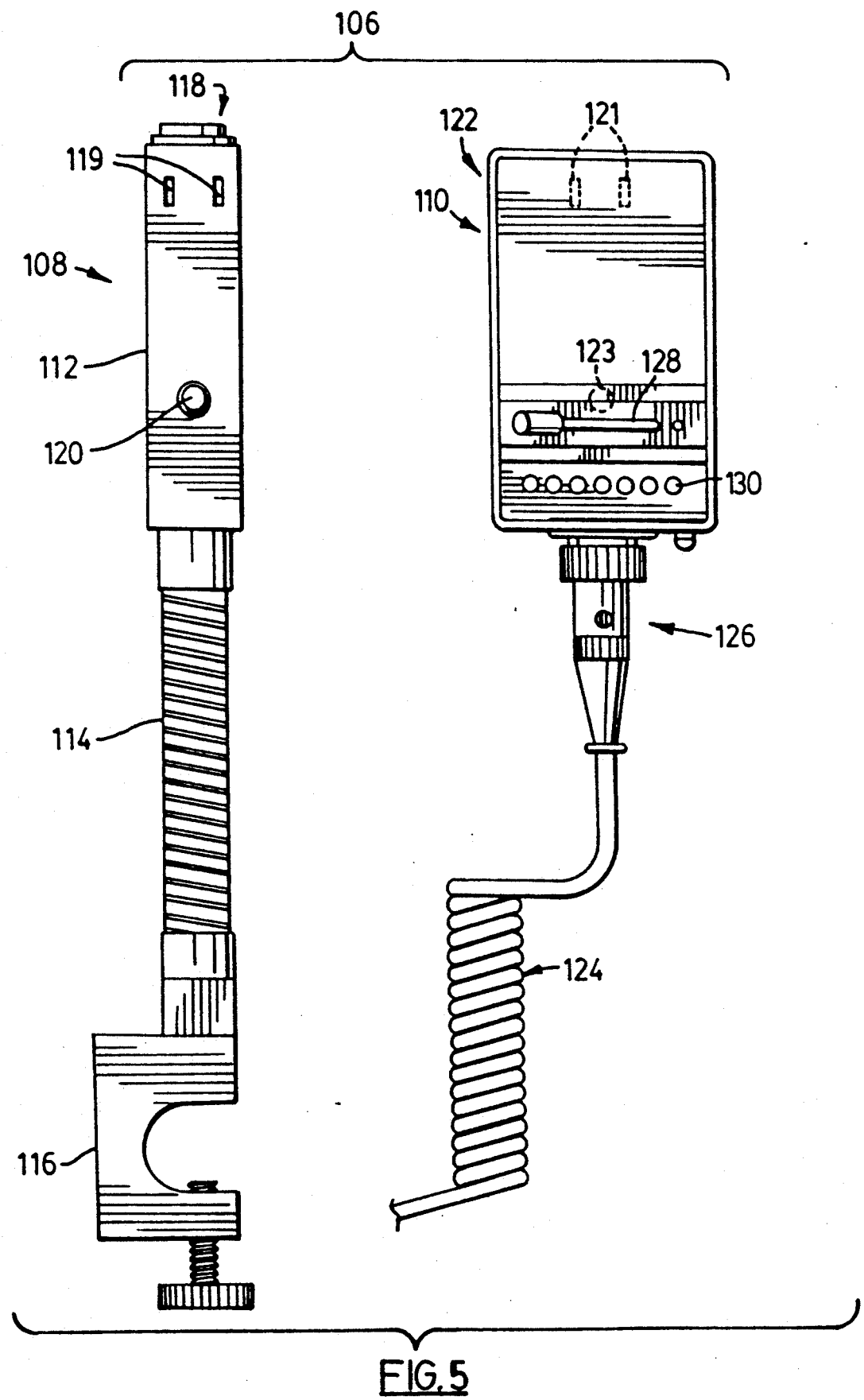
FIG. 5 is a partially exploded front elevation of a hand control assembly for a device according to the present invention.

The power assist device 5 further comprises a manually initiated electronic controller and a source of electrical power for controlling and operating the power assist device 5. The source of electrical power consists of a battery 100 having battery cells 102 (shown in FIGS. 2 and 3) and placed within the body 7. The electronic controller comprises a first limit switch 104, a second limit switch 105, a circuit board in the body 7 with relays, and a hand control assembly 106 (shown in FIG. 5). The first limit switch 104 disengages said second drive motor 41 when the translator 57 is fully lowered. Limit switch 104 may be, for example, a contact limit switch activated by contact with roller 61. The second limit switch 105 disengages said second drive motor 41 when the translator 57 is fully raised. Said circuit board electrically communicates between the hand control assembly 106, limit switches 104, 105, and first and second drive motors 11, 41.

The hand control assembly 106 has a first component 108 and second component 110. The first component 108 comprises a block 112, a neck 114 connected to the block 112, and a clamp assembly 116 for mounting said first component to the frame 3 of the wheelchair 1. The neck 114 is preferably made of a stiff coiled material to hold said first component 108 in an upright position. The block 112 has a master switch 118 on the top horizontal face of said block 112 furthest from the clamp assembly 116 and a male jack 120 on the adjacent side face of said block 112, said switch 118 and jack 120 capable of electrical communication therebetween. There is also at least one female recess 119 as shown, to accommodate a standard male 120 VAC prongs 121 which protrude from the back of a control unit 122 described below. The master switch 118 has an "ON" and "OFF" position, the significance of which is described below.

The second component 110 has a control unit 122 and a cable 124. One end of cable 124 has a coupler 126 for connecting said cable 124 to said control unit 122, and the other end is connected to said circuit board to allow said control unit 122 to communicate with said circuit board. The control unit 122 comprises an actuating switch 128, battery level indicators 130 and on the opposite side a standard male jack 121 and female receptacle 123. The male jack 121 and female receptacle 123 are located to couple with the female receptacles 119 and male jack 120, respectively, so as to couple the first and second components 108, 110 together. The coupling of the male and female jacks allows both of said components to communicate electronically. The activating switch 128 has first, second and "OFF" positions, the significance of which is described below.

It can now be appreciated how the preferred embodiment of the present invention works. When the drive wheel 9 of the power assist device 5 is in the raised position, the wheelchair user may propel himself in the wheelchair 1 by pulling down on the wheels 2 or on gripping rims attached thereto. However, when the user desires mechanical assistance in propelling said wheelchair 1, the user may initiate the power assist device 5 by manually operating the hand control assembly 106. The power assist device 5 may be operated by the user in two manners, depending whether the master switch 118 is in the "ON" or "OFF" position.

Beginning with the master switch 118 in the "ON" position and the actuating switch 128 in its "OFF" position, the user may move the actuating switch 128 into the first position to energize both the first motor 11 and the second motor 41. The first motor 11 imparts forward rotation to the drive wheel 9 (i.e. in a manner which would propel the wheelchair 1 in a direction that the user of the wheelchair normally faces) at approximately 45 revolutions per minute (RPM). The second motor 41 causes the drive wheel 9 to be lowered. Upon energization, said second motor 41 rotates the second drive shaft 47 and imparts rotation to the second gear 49 and the third gear 55. The third gear 55 lowers the translator 57 (i.e. moves the translator in a direction from the pivoting arm 13 past the third gear 55) which in turn lowers the pivoting arm 13 resting upon said translator 57. When the pivoting arm 13 lowers the drive wheel 9 into surface engaging position, the translator 57 continues to be lowered and the upper portion 59 of the translator 57 ceases to support the pivoting arm 13 by moving out of contact with said pivoting arm 13 which is now supported by contact of the drive wheel 9 with the surface 4. When the roller 61 on translator 57 trips the first limit switch, the second motor 41 is de-energized and the translator 57 comes to rest. In this lowered resting position the translator displaces the spring 63 which in turn tends to urge the drive wheel 9 into said surface engaging driving contact.

When said drive wheel 9 comes into contact with the surface 4, said rotation of said wheel 9 begins to propel the wheelchair 1 forwardly. The speed of the wheelchair 1 may be increased if the user places the actuating switch 128 into its second position. In this second position, the first motor 11 preferably imparts a rotation of approximately 75 RPM to the drive wheel 9. When such powered assistance is no longer desired, the user may de-activate the power assist device 5 by manually moving the actuating switch 128 back into its "OFF" position to cause the first motor 11 to stop operating and thus stopping the wheelchair 1. The second motor 41 is preferably simultaneously energized to cause said drive wheel 9 to be raised. Upon said energization, said second motor 41 rotates the third gear 55, as described earlier but in the opposite direction, to raise the translator 57. As the translator 57 rises, the tension in spring 63 diminishes and said translator 57 contacts the pivoting arm 13, lifting said drive wheel 9 out of said surface engaging driving position. Upon a pre-determined amount of travel, a tab on translator 57 trips the second limit switch to de-activate the second motor 41, leaving the pivoting arm 13 resting on the translator 57 in the raised position, completing the cycle. The wheelchair user is again free to manually propel himself in the wheelchair 1.

The second manner of operating the power assist device 5 is with the master switch 118 in the "OFF" position. By moving the actuating switch 128 from its "OFF" position to its first position, only the second motor 41 is energized to lower the drive wheel 9 into surface engaging driving position as described above. The first motor 11 is not energized, and therefore the drive wheel 9 is not rotating when it is placed in said driving position. In this position, the drive motor 11 cannot be energized by placing the actuating switch 128 in its second position either. The user may energize the first motor 11 only by placing the master switch 18 into its "ON" position, thus propelling the wheelchair 1 forwardly.

When such power assistance is no longer desired, the user has two choices. First, the user may de-activate the power assist device 5 by manually moving the actuating switch 128 back into its "OFF" position, thereby raising the drive wheel 9 out of surface contact as described earlier.

Second, the user may choose to de-activate the first motor 11 by moving the master switch back to its "OFF" position. In this mode, the drive wheel 9 simply ceases to propel the wheelchair 1, but said drive wheel 9 is not raised and remains in surface contact. When the user wishes to again initiate the power assist device 5 to propel the wheelchair 1, the master switch 118 must be returned to its "ON" position and the user must ensure that the actuating switch 128 is in its first or second positions. If the master switch 118 remains in its "OFF" position, then, as a safety precaution, the first motor 11 cannot be energized by moving the actuating switch 128, by accident or intentionally, into its first or second positions.

In the event that the control unit 122 is accidentally disengaged from block 112 while the power assist device 5 is operating, the uncoupling of male jack 120 from the female jack will cause the first motor 11 to be de-energized and the drive wheel 9 to remain in ground engaging contact. This is a particularly useful feature if such disengagement should occur while the wheelchair 1 is on an upramp or downramp, since it will help brake the wheelchair's movement down the ramp.

A feature of the preferred control unit 122 is the battery level indicator 122 which show the user the charge remaining in battery 100. A further preferred feature is that the cable 124 and coupler 126 are adapted to be uncoupled so that the device 5 can be removed from the chair while leaving the control unit 122 attached to the mounting block 112. Recharging of the battery 100 is accomplished by removing the main controller 122 and inserting male prongs on the back of the controller into a standard 120 VAC wall receptacle. As a safety feature, this preferably trips a relay which disengages the switch 128 from the main circuit, thus eliminating any possibility of accidental activation. After the battery 100 is re-charged, the cable 124 and the coupler 126 are again coupled with control unit 122 for further operation of the power assist device.

It can now be appreciated that when said drive wheel 9 is in the lowered position, the biaser 63 keeps the drive wheel 9 in surface engaging driving position whether the wheelchair 1 is on level surfaces, upramps, downramps or curbs. Therefore, the power assist device 5 may be used for breaking when going down a downramp since the drag from the first motor 11 will hold the wheelchair 1 to a safe speed.

It will also be appreciated that the user has the option of not activating the first motor 11 until the drive wheel 9 is lowered into a surface engaging driving position, and to also de-activate the first motor 11 prior to its being raised out of said driving position. In this manner, any jarring of the wheelchair 1 due to the lowering of a spinning drive wheel can be avoided. Also, the device may be adapted to work forwardly or in reverse. Hence, the device may be used to move a wheelchair backwards up an upramp.

Although the present invention has been described with reference to a preferred example thereof, it will be apparent to those skilled in the art that various alterations and modifications may be carried out without departing from the broad scope of the invention as defined in the following claims. For instance, the biaser 63 in the present embodiment comprises a spring, but satisfactory results may also be achieved by replacing the spring with a torque bar as described earlier. As well, the aforementioned attachments for securing the body 7 to the frame 3 may be made integral with the frame 3 as described earlier.

We claim:

1. A power assist device for a wheelchair which is wheeled along a surface and has a frame, said power assist device comprising:
   a body, a drive wheel connected to said body and being movable between a raised position and a lowered surface engaging position, attachments for securing said body to said frame, a first motor for driving said drive wheel at least when said drive wheel is in the lowered surface engaging position, a second motor connected to the drive wheel for raising said drive wheel out of surface engaging contact and for lowering said drive wheel into surface engaging contact, a biaser, in addition to gravity, for urging said drive wheel into surface engaging driving contact, a manually initiated electronic controller for controlling said power assist device, and a source of electrical power.

2. The power assist device as claimed in claim 1 wherein said first motor is pivotally attached to said body.

3. The power assist device as claimed in claim 2 wherein a first drive shaft extends between said first motor and said drive wheel, said first drive shaft having a first drive take off for imparting rotation to said drive wheel.

4. The power assist device as claimed in claim 3 wherein the first drive take off comprises a worm gear.

5. The power assist device as claimed in claim 3 wherein a first gear is connected to said drive wheel and engages said first drive take off for imparting rotation to said drive wheel about a longitudinal axis.

6. The power assist device as claimed in claim 1 wherein said drive wheel is carried on a pivoting arm.

7. The power assist device as claimed in claim 6 wherein a first end of said arm is pivotally attached to said body, and said arm carries said drive wheel and said first motor.

8. The power assist device as claimed in claim 7, in which said arm has two generally opposed support plates and said second motor is connected to one of said support plates and said drive wheel is located behind said support plates.

9. The power assist device as claimed in claim 1 further including a translator between said second motor and said drive wheel for raising and lowering said drive wheel.

10. The power assist device as claimed in claim 9 wherein said drive wheel is carried on an arm pivotally attached to said body, and said translator supports said arm when said arm is in said raised position.

11. The power assist device as claimed in claim 10 wherein said translator is raised and lowered by said second motor, and when said translator is in said lowered position said translator extends said biaser which in turn tends to urge said drive wheel into surface engaging driving contact.

12. The power assist device as claimed in claim 11 wherein said biaser comprises a spring.

13. The power assist device as claimed in claim 12 wherein said spring acts between said arm and said translator.

14. The power assist device as claimed in claim 1 wherein said drive wheel is pivotally attached to said body and said biaser comprises a torque bar urging said driving wheel into ground engaging position about said pivotal attachment.

15. The power assist device as claimed in claim 1 wherein said attachments include at least one plate having first and second edges, said first edge being connected to said body, and said second edge including securing means for securing said plate to said frame of said wheelchair.

16. The power assist device as claimed in claim 15 wherein said securing means comprises at least one clamp and locking bolt assembly for clamping onto said frame.

17. The power assist device as claimed in claim 1 wherein said attachments include at least one supporting member, a first end of said member connected to said body and a second end of said member pivotally connected to a mounting clamp, said clamp being securable to said frame.

18. The power assist device as claimed in claim 17 wherein said attachments further include a stabilizing rod with a quick release detachment.

19. A power assist device as claimed in claim 1 wherein said electronic controller includes a hand control assembly for selectively energizing said first motor to propel said wheelchair and said second motor to cause said drive wheel to be either raised or lowered.

20. A power assist device as claimed in claim 19 wherein said electronic controller further includes at least two limit switches for de-activating said second motor.

21. A power assist device as claimed in claim 20 wherein said limit switches comprise a first limit switch for de-activating said second motor when said drive wheel is in the lowered surface engaging position and a second limit switch for de-activating said second motor when said drive wheel is in its uppermost raised position.

22. A power assist device as claimed in claim 21 wherein said hand control assembly comprises separable first and second components which communicate electronically, said first component having a master switch, a male jack, and a clamp assembly for mounting said hand control assembly onto said frame of said wheelchair, said second component having a cable for electrical communication with said first and second motors having a control unit comprising an actuating switch, at least one battery level indicator and a female jack adapted to couple with said male jack for said electronic communication between said components, said master switch and actuating switch adapted for use by the user of said wheelchair to operate said power assist device.

23. A power assist device for a wheelchair which is wheeled along a surface and has a frame, said power assist device comprising:

a body, a drive wheel which is carried on a pivoting arm, said arm having a first end pivotally attached to said body and carrying a first motor, said drive wheel being movable between a raised position and a lowered surface engaging position, attachments for securing said body to said frame, said attachments including at least one plate having first and second edges, said first edge connected to said body, and securing means along the second edge for securing said plate to said frame, a first drive shaft extending between said first motor and said drive wheel, said first drive shaft having a first drive take off for imparting rotation to said drive wheel, a second motor for raising and lowering said drive wheel independently from said first motor, a translator driven by said second motor and acting between said second motor and said arm for raising and lowering said drive wheel, a biaser between said pivoting arm and said translator for urging said drive wheel into surface engaging driving contact, a manually initiated electronic controller for controlling said power assist device, and a source of electrical power.

24. A wheelchair which is wheeled along a surface comprising:

a frame, a seat for a user supported by said frame, at least two wheels attached to said frame for manually wheeling said wheelchair along said surface, and a power assist device for said wheelchair comprising a body, a drive wheel connected to said body and being movable between a raised position and a lowered surface engaging position, attachments for securing said body to said frame, a first motor for driving said drive wheel at least when said drive wheel is in the lowered surface engaging position, a second motor connected to the drive wheel for raising and lower said drive wheel out of and into ground engaging contact respectively, a biaser, in addition to gravity, for biasing said drive wheel into surface engaging driving contact, a manually initiated electronic controller for controlling said power assist device, and a source of electrical power.

* * * * *

UNITED STATES PATENT AND TRADEMARK OFFICE
CERTIFICATE OF CORRECTION

PATENT NO. : 5,222,567
DATED : June 29, 1993
INVENTOR(S) : Broadhead et al.

It is certified that error appears in the above-indentified patent and that said Letters Patent is hereby corrected as shown below:

On the Title Page, item [73] Assignee: "Genus Inc.," Ontario, Canada, should be replaced by
-- Genus Medical Inc., --.

Signed and Sealed this

Twenty-first Day of May, 1996

Attest:

BRUCE LEHMAN

*Attesting Officer*         *Commissioner of Patents and Trademarks*